Feb. 5, 1957     M. ROSENBAUM     2,780,004

MEANS FOR MEASURING FACIAL PROPORTIONS

Filed March 25, 1954

*INVENTOR.*
MEYER ROSENBAUM
BY Bernard J. Cantor
ATTORNEY

United States Patent Office 2,780,004
Patented Feb. 5, 1957

2,780,004

MEANS FOR MEASURING FACIAL PROPORTIONS

Meyer Rosenbaum, Detroit, Mich., assignor to Facial Graph Corporation, Detroit, Mich., a corporation of Michigan Application March 25, 1954, Serial No. 418,645

5 Claims. (Cl. 33—174)

This invention relates to a means for measuring human facial proportions to guide in the selection of eye glass frames which are suitable to the facial proportions of eye glass wearers.

In the past, after a patient's eyes are examined by an oculist and the type of lens prescribed, the patient has been shown a large number of eye glass frame types and permitted to select that frame type which he desires. This system of frame selection has certain serious shortcomings in that the patient in most cases selects a frame type which does not look good upon his face. The patient normally has no experience in frame selection and moreover, has no idea of which type of frame enhances his appearance and which type detracts from his appearance.

Part of the problem in prescribing glasses is that of psychologically preparing the patient to wear the glasses. If the patient feels uncomfortable or conspicuous or feels that his appearance is altered for the worse by the glasses, in most cases he will not wear the glasses in public. This results in a patient, who needs glasses, using the glasses only when he is forced to do so due to eye strain.

Thus, it is an object of my invention to provide a means of selecting glasses, for a patient, which frames "go well with" or enhance the appearance of the wearer.

It is an additional object of my invention to provide a means whereby glasses are fitted in accordance with the contour and shape of the patient's face.

Another object of my invention is to provide a means whereby the lower portion of the patient's face is measured and the eye glasses selected, which fit over the upper portion of the face, may be complementing to said lower facial portion.

A further object of my invention is to provide a device which is adapted to quickly and simply measure the proportions of the patient's face and particularly to measure the proportions of the lower portion of the face.

Yet another object of my invention is to provide a means whereby the proportions and contour of the lower portion of the patient's face may be determined and eye glass frames may then be selected in conformity with said determinations to thereby enhance the appearance of the wearer.

It is still another object of my invention to provide a method and means for scientifically selecting suitable eye glass frames for a patient whereby the patient is psychologically prepared to wear his glasses and in addition knows that the frames selected enhance rather than detract from his appearance.

Other objects and advantages of the invention will become apparent from the following description.

In the accompanying drawings forming a part of the specification and showing one preferred form of this invention:

Figure 1:
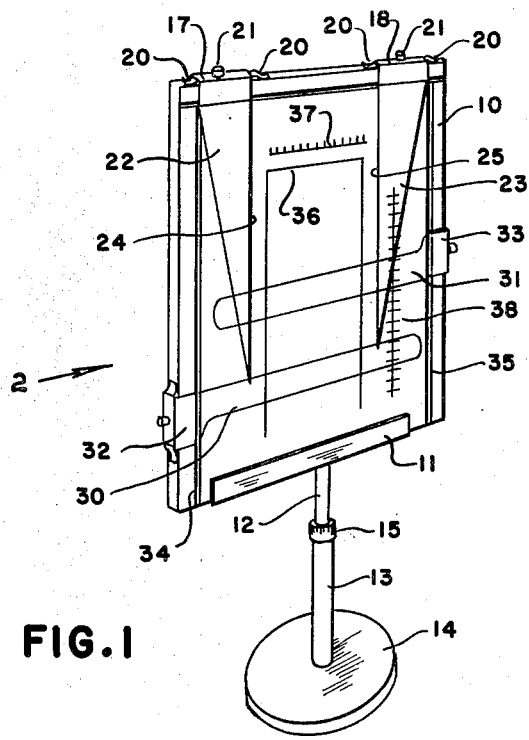
Figure 1 is a view of my device for measuring the proportions of a face.
Figure 2:
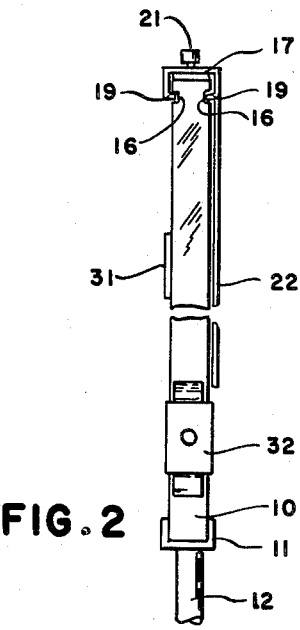
Figure 2 is a side view taken in the direction of arrow 2 on Figure 1.

Referring, first, to Figure 1, there is shown my facial proportion measuring device which comprises a transparent sight panel 10, with a support channel 11 secured to the bottom edge thereof. The support channel 11 is rigidly secured to a rod 12 by means of welding or the like. Rod 12 telescopes within a tube 13 which is rigidly fastened to a stand base 14. A nut 15 is provided to adjustably hold the rod in any desired position in the tube. This nut may be of any conventional type and accordingly is not described in detail.

The sight panel 10 is provided with a pair of horizontal grooves 16—16 adjacent the top edge thereof. A pair of channels 17 and 18 are slidably mounted upon the top edge of said sight panel, and these channels are provided with flanges 19 which engage within grooves 16—16.

As seen in Figure 1, leaf springs 20 secured to channels 17 and 18 bias the channels away from the sight panel to provide a frictional fit therewith. In addition set screws 21 mounted on the channels may be tightened to engage the top edge of panel 10 whereby the channels are temporarily clamped in position.

Permanently fastened to one side of each channel 17 and 18 are vertical straight edges 22 and 23. These straight edges have working edges 24 and 25, respectively, whose use will be described hereinafter.

In addition to the vertical straight edges, a pair of horizontal straight edges 30 and 31 are provided which are permanently fastened to channels 32 and 33. These channels are of the same construction as channels 17 and 18 previously described and have similar springs and set screws. Channels 32 and 33 are engaged in vertical grooves 34 and 35, which are shown only on one side of the sight panel in Figure 1.

Near the upper portion of the sight panel 10, there is located a sight line 36 which comprises a horizontal line connected at each end with a pair of vertical lines (see Fig. 1). Above the sight line are indicia 37 to indicate the horizontal spacing between the working edges 24 and 25 of the vertical straight edges. Likewise, indicia 38 is provided to measure the spacing between the horizontal straight edges.

It is preferable to construct the sight panel from a sheet of transparent plastic or glass. The straight edges may be formed of any suitable rigid sheet material as for example an inflexible plastic sheet.

Operation

To measure the facial proportions of a patient's face the following procedure is followed:

The oculist is seated on one side of the sight panel 10 and the patient on the opposite side. The distance which each sits from the panel may be some predetermined amount such as for example, approximately two feet.

Figure 3:
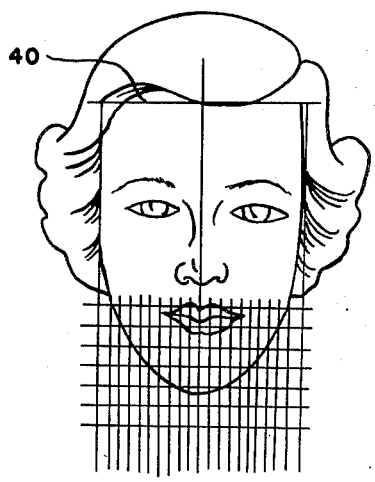
Figure 3 is an illustration of a chart which may be used with the above device to record the facial proportions determined.

Next, with the patient looking straight ahead, the oculist looks through the sight panel and vertically adjusts said panel by loosening and tightening nut 15 until the horizontal portion of sight line 36 is in alignment with the patient's hairline 40 (see Fig. 3). Thereafter, the oculist grasps the tube 13 and slides the instrument towards or away from himself until the vertical sight line portions of sight line 36 each exactly split one of the patient's ears from his head.

Following the above operation, the horizontal straight edge 31 is moved until the lower edge thereof is aligned with the lowest portion of the patient's lower lip. Then the horizontal straight edge 30 is moved until the upper or top edge is aligned with the lowest portion of the patient's chin.

Lastly, the vertical straight edges are moved until their working edges 24 and 25 intersect the upper horizontal straight edge 31 at the points where the lower edge of this straight edge 31 intersects the outer lines of the patient's jaw.

The spacing between each pair of straight edges may now be read directly from the indicia 37 and 38. This spacing may now be marked upon the graph illustrated in Figure 3.

In this manner, the exact shape of the lower portion of the patients face has been accurately determined.

The oculist now uses this determination to select a frame style which is suitable to the patients face. Thus the frame, which covers the upper portion of the patient's face is complementary to the lower portion thereof and the patient's general appearance may be improved rather than detracted from.

Figure 4:
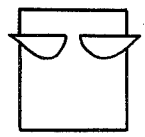
Figures 4 to 7 are schematic views of several different types of faces and a type of glass frame which would be suitable in each case.

Examples of types of frames which may be selected are shown in Figures 4 to 7. In Figure 4, where the patient has a short square jaw the top line of the glass frame should tend towards straightness with a curved lower line to appear to lengthen the face and soften the facial angles.

Figure 5:
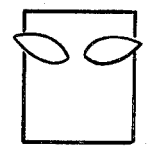

In Figure 5, where the patient has a long square full jaw, a frame having a curved top and bottom will tend to make the face appear shorter and will also soften angular lines.

Figure 6:
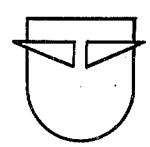

In Figure 6, a frame having a straight top line with an angular lower line for a patient having a short oval full jaw will make the patient's face appear to be longer and will avoid accenting the round contours.

Figure 7:
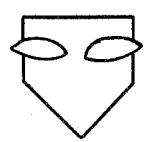

Figure 7, shows a face having a diamond shaped narrow jaw. In this case a frame having a round top edge will contradict the width at the temples. In addition a delicate rather than a heavy frame should be selected to better balance the mouth and chin.

This invention may be developed within the scope of the following claims without departing from the essential features of the said invention and it is desired that the specification and drawings be read as being merely illustrative of a practical embodiment of the same and not in a strictly limiting sense.

I claim:

1. A device for measuring facial proportions comprising a transparent sight panel slidably mounted in a vertical plane upon a movable stand, a pair of vertical straight edges slidably mounted upon said panel and each adapted to be aligned with a side of the face to be measured, a pair of horizontal straight edges sildably mounted upon said panel and each adapted to be so positioned as to set off a horizontal portion of said face, guide means upon said panel whereby said panel may be vertically aligned with said face, and indicia upon said panel to indicate the spacing between each of said straight edges.

2. A device for measuring facial proportions of a patient comprising a transparent sight panel arranged in a vertical plane, a movable stand supporting said panel, the stand being vertically adjustable in height for adjusting the panel in a vertical direction; a guide line formed on the central portion of the panel and comprising a horizontal portion to be aligned with the patient's hairline and a pair of spaced vertical portions each to be aligned with one side of the patient's face at the points where the patient's ears join the head; a pair of horizontal straight edges slidably mounted upon said panel, said straight edges to be aligned with the patient's lower lip and chin respectively, and a pair of vertical straight edges each to be aligned at one of the points where the patient's face outline intersects the straight edge aligned with the lower lip, and indicia so located upon said panel as to indicate the spacing between each pair of vertical and horizontal straight edges.

3. A device for measuring facial proportions of a patient, comprising a transparent sight panel arranged in a vertical plane and supported by a movable and vertically adjustable stand; a guide line formed on the central portion of the panel and consisting of a horizontal portion and a pair of spaced vertical portions, said portions serving to outline a patient's face from the hairline down and between the outer edges of the face; a pair of horizontal straight edges each slidably mounted upon said panel by means of a channel connected to one end of the straight edge and each channel overlying a vertical edge of the panel and having flanges slidably fitted into vertical grooves formed on opposite surfaces of the panel adjacent said vertical edge, said straight edges being movable to set off the portion of the patient's face between the lips and chin; and a pair of vertical straight edges each slidably mounted upon the panel by means of a channel connected to one end of each straight edge and overlying a horizontal edge of the panel and having flanges slidably fitted into grooves on opposite surfaces of the panel adjacent said horizontal edge, said vertical straight edges being movable to set off the portion of the patient's face between the horizontal straight edges.

4. A device for measuring facial proportions of a patient as defined in claim 3 above and including indicia upon the panel and located so as to give a direct reading of the spacing between each pair of vertical and horizontal straight edges.

5. A device for measuring facial proportions of a patient as defined in claim 3 above and including releasable locking means on each of said straight edge mounting channels for locking each straight edge in a patient's face measuring position.

References Cited in the file of this patent

UNITED STATES PATENTS

| Number | Name | Date |
|---|---|---|
| 1,990,297 | McFadden | Feb. 5, 1935 |
| 2,043,230 | Boll et al. | June 9, 1936 |
| 2,115,357 | Bancroft et al. | Apr. 26, 1938 |
| 2,138,293 | Comino | Nov. 29, 1938 |
| 2,190,947 | Kinzler | Feb. 20, 1940 |
| 2,269,312 | Johnston | Jan. 6, 1942 |
| 2,511,654 | Spoor | June 13, 1950 |
| 2,579,386 | Koenig | Dec. 18, 1951 |
| 2,602,237 | Navarre | July 8, 1952 |